United States Patent
Ma et al.

(10) Patent No.: US 8,338,813 B2
(45) Date of Patent: Dec. 25, 2012

(54) BIT-ERASING ARCHITECTURE FOR SEEK-SCAN PROBE (SSP) MEMORY STORAGE

(75) Inventors: Qing Ma, San Jose, CA (US); Valluri R. Rao, Saratoga, CA (US); Tsung-Kuan Allen Chou, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/631,265

(22) Filed: Dec. 4, 2009

(65) Prior Publication Data

US 2010/0080051 A1  Apr. 1, 2010

Related U.S. Application Data

(63) Continuation of application No. 11/477,276, filed on Jun. 28, 2006, now Pat. No. 7,750,333.

(51) Int. Cl.
 *H01L 47/00* (2006.01)
(52) U.S. Cl. .................................. 257/2; 257/4
(58) Field of Classification Search ............ 257/1–5, 257/E45.002
See application file for complete search history.

(56) References Cited

U.S. PATENT DOCUMENTS

| | | | |
|---|---|---|---|
| 6,208,789 B1 * | 3/2001 | Ogimoto | 385/123 |
| 6,790,592 B2 | 9/2004 | Harigaya et al. | |
| 6,869,841 B2 * | 3/2005 | Xu | 438/239 |
| 6,894,305 B2 | 5/2005 | Yi et al. | |
| 6,943,395 B2 | 9/2005 | Oh et al. | |
| 7,183,567 B2 * | 2/2007 | Chiang | 257/3 |
| 7,292,520 B2 * | 11/2007 | Matsui | 369/126 |
| 7,352,660 B2 * | 4/2008 | Brooks et al. | 369/13.28 |
| 7,439,536 B2 | 10/2008 | Pellizzer et al. | |
| 2004/0188668 A1 | 9/2004 | Hamann et al. | |
| 2006/0006472 A1 | 1/2006 | Jiang | |
| 2006/0013034 A1 | 1/2006 | Lowrey et al. | |
| 2008/0258129 A1 | 10/2008 | Toda | |

FOREIGN PATENT DOCUMENTS

| | | |
|---|---|---|
| JP | 2004349504 | 9/2004 |
| JP | 2004363586 | 12/2004 |
| JP | 2005536071 | 11/2005 |
| KR | 10-2004-0107487 A | 12/2004 |
| WO | 2006/121473 A1 | 11/2006 |
| WO | 2008/002943 A1 | 1/2008 |

OTHER PUBLICATIONS

International Search Report/ Written Opinion for PCT Patent Application No. PCT/US2007/072163, mailed on Oct. 23, 2007, 9 pages.
International Preliminary Examination Report on Patentability for PCT Patent Application No. PCT/US2007/072163, mailed on Jan. 15, 2009, 6 pages.

(Continued)

*Primary Examiner* — Cuong Q Nguyen
(74) *Attorney, Agent, or Firm* — Blakely, Sokoloff, Taylor & Zafman LLP

(57) ABSTRACT

An apparatus comprising a substrate, a heater formed on the substrate, and a phase-change layer formed on the heater. The heater comprises a heater layer and first and second electrodes electrically coupled to the heater layer. A process comprising forming a heater on a substrate and forming a phase-change layer on the heater. The heater comprises a heater layer and first and second electrodes electrically coupled to the heater layer.

25 Claims, 5 Drawing Sheets

OTHER PUBLICATIONS

Office Action mailed Aug. 31, 2010 for Korean Patent Application No. 10-2008-7030503; 9 pages including 4 pages of English translation.

Office Action received for Chinese Patent Application No. 200780023834.2, mailed on Jun. 24, 2010, 9 pages of Chinese office action including 6 pages of English translation.

Office Action received for Taiwan Patent Application No. 96123339, Mar. 3, 2011, 17 pages of Taiwan office action including 7 pages of English translation.

Office Action received for United Kingdom Patent Application No. 0822743.1, mailed on Jan. 19, 2011, 2 pages of United Kingdom office action.

Examination Report for United Kingdom Patent Application No. GB0822743.1 mailed Mar. 30, 2011, 3 pgs.

Non-Final Office Action mailed Oct. 14, 2009 for U.S. Appl. No. 11/477,276.

Notice of Allowance mailed May 24, 2010 for U.S. Appl. No. 11/477,276.

Notification of Grant mailed Apr. 7, 2011 for Chinese Patent Application No. 2007 80023834.2.

Notice of Reasons for Rejection mailed Nov. 22, 2011 for Japanese Patent Application No. 2009-510202.

* cited by examiner

BIT-ERASING ARCHITECTURE FOR SEEK-SCAN PROBE (SSP) MEMORY STORAGE

The present application is a Continuation of, and claims priority to and incorporates by reference in its entirety, the corresponding U.S. patent application Ser. No. 11/477,276 filed Jun. 28, 2006, and entitled "BIT-ERASING ARCHITECTURE FOR SEEK-SCAN PROBE (SSP) MEMORY STORAGE," and issued as U.S. Pat. No. 7,750,333 on Jul. 6, 2010.

TECHNICAL FIELD

The present invention relates generally to micro-electromechanical (MEMS) devices and systems and in particular, but not exclusively, to erasable MEMS seek-scan probe (SSP) memories.

BACKGROUND

Conventional solid state memories employ micro-electronic circuit elements for each memory bit. Since one or more electronic circuit elements are required for each memory bit (e.g., one to four transistors per bit), these devices can consume considerable chip "real estate" to store a bit of information, which limits the density of a memory chip. The primary memory element in these devices is typically a floating gate field effect transistor device that holds a charge on the gate of field effect transistor to store each memory bit. Typical memory applications include dynamic random access memory (DRAM), static random access memory (SRAM), erasable programmable read only memory (EPROM), and electrically erasable programmable read only memory (EEPROM).

A different type of solid state memory commonly known as a phase-change memory uses a phase-change material as the data storage mechanism and offers significant advantages in both cost and performance over conventional memories based on charge storage. Phase change memories use phase change materials—in other words, materials that can be electrically switched between two or more phases having different electrical characteristics such as resistance. One type of memory element, for example, uses a phase change material that can be electrically switched between a generally amorphous phase and a generally crystalline local order, or between different detectable phases of local order across the entire spectrum between completely amorphous and completely crystalline phases.

The phase-change memory can be written to, and read from, by applying current pulses that have the appropriate magnitude and duration and that cause the needed voltages across and current through the volume of phase-change material. A selected cell in a phase-change memory can be programmed into a selected state by raising a cell voltage and a cell current for the selected cell to programming threshold levels that are characteristic of the phase-change material. The voltage and current are then typically lowered to quiescent levels (e.g. essentially zero voltage and current) that are below the programming threshold levels of the phase-change material. This process can be performed by the application of, for example, a reset pulse and a set pulse which can program the cell into two different logic states. In both of these pulses, the cell voltage and cell current are caused to rise at least as high as certain threshold voltage and current levels needed to program the cell. Next, to read the programmed cell, a read pulse can be applied to measure the relative resistance of the cell material, without changing its phase. Thus, the read pulse typically provides a much smaller magnitude of cell current and cell voltage than either the reset pulse or the set pulse.

These electrical memory devices typically do not use field effect transistor devices, but comprise, in the electrical context, a monolithic body of thin film chalcogenide material. As a result, very little chip real estate is required to store a bit of information, thereby providing for inherently high density memory chips. The phase change materials are also truly non-volatile in that, when set in either a crystalline, semi-crystalline, amorphous, or semi-amorphous phase representing a resistance value, that value is retained until reset as that value represents a physical phase of the material (e.g., crystalline or amorphous).

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus, system and method for a seek-scan probe (SSP) phase-change memory are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1A:
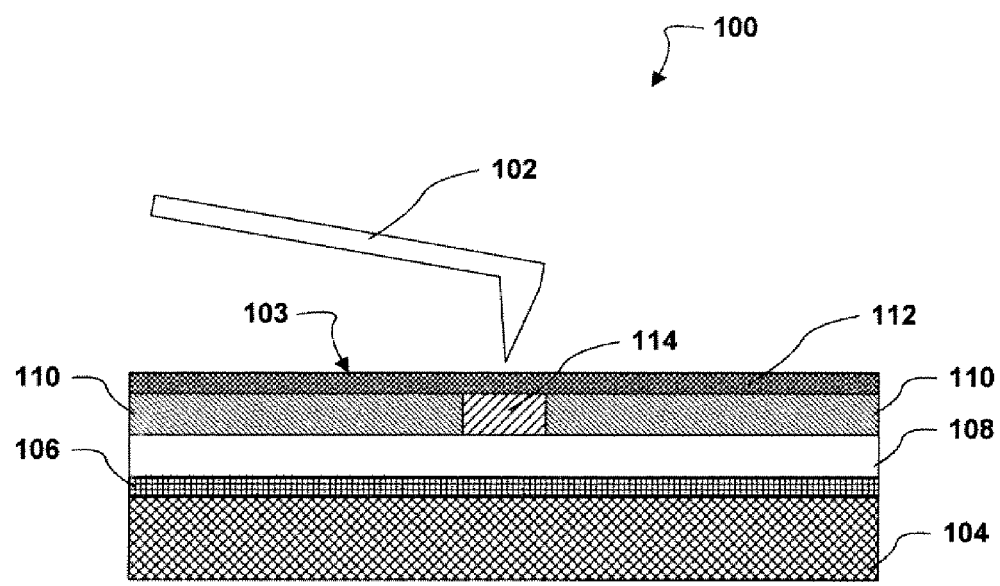
FIG. 1A is a side elevation of a seek-scan probe (SSP) phase-change memory.
Figure 1B:
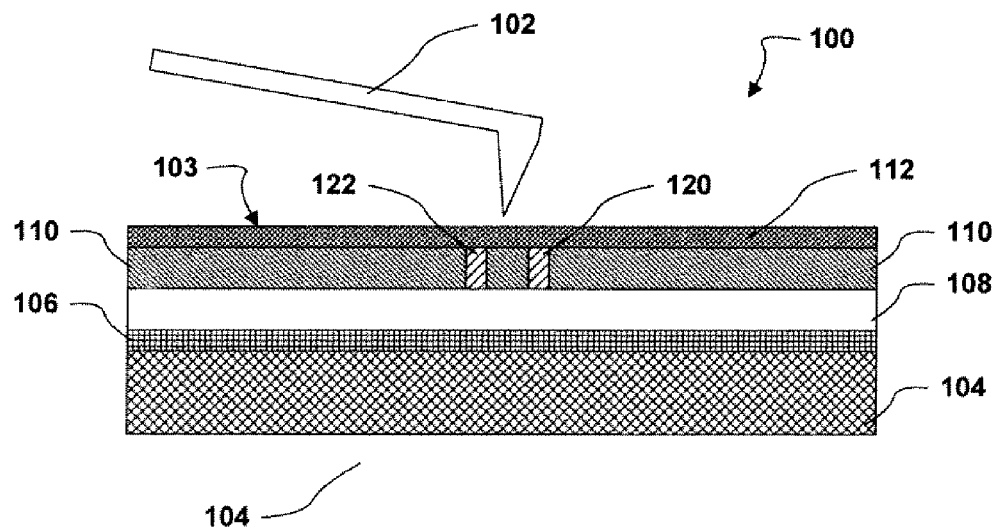
FIG. 1B is a side elevation of the memory of FIG. 1A after an attempt to erase a bit written in the memory.

FIGS. 1A and 1B illustrate an embodiment of a seek-scan probe (SSP) phase-change memory 100 that uses a probe 102 to write data in and read data from a memory cell 103. The memory cell 103 includes a substrate 104 having a dielectric layer 106 formed thereon. An electrode layer 108 is formed on dielectric layer 106, and a phase-change layer 110 is formed on the electrode layer. A protective cap layer 112 is optionally formed on phase-change layer 110. FIG. 1A illustrates memory 100 with a data bit written in phase-change layer 110. In an SSP memory such as memory 100, a data bit is written in phase-change layer 110 by passing a current between the tip of probe 102 and electrode layer 108. Phase-change layer 110 is initially in a uniform first phase, such as an amorphous phase in an embodiment where phase-change layer 110 is a chalcogenide. The heat generated by the current passed between the tip of probe 102 and electrode layer 108 transforms a small region 114 of phase-change layer 110 from a first phase (such as an amorphous phase) to a second phase (such as a polycrystalline phase) with relatively higher or lower resistivity. Region 114 of phase change layer 110 then represents a data bit that can be read using the same probe 102. To read the data, probe 102 is passed over the surface of the memory cell and a small current is passed between the probe and second electrode 108 such that the probe can sense the change of resistivity in when it is over or near the region 114. When it senses the change in resistivity, probe 102—which is coupled to appropriate electronic equipment not shown in the figure—registers the data bit as a 1 or a 0, as the case may be.

FIG. 1B illustrates the memory 100 after an attempt to erase data bit 114 using probe 102. Erasing a data bit in a phase change memory requires that the phase of region 114 be changed back to the original phase of phase-change layer 110. For example, in FIG. 1A writing a bit in phase-change layer 110 involved changing the phase of region 114 from amorphous to polycrystalline; erasing the bit thus requires changing the phase of region 114 from polycrystalline back to amorphous. One way to change the phase of region 114 is to pass a large current between the tip of probe 102 and electrode 108 to quickly heat region 114 and then quickly quench the heated material to return the material in region 114 to its polymorphous phase. Experiments and simulation have shown that erasing such a bit using the tip of probe 102 is very difficult, because any attempt to heat up region 114 and rapidly quench it into amorphous phase unavoidably creates a ring of polycrystalline material 120 surrounding the amorphous dot 122 created.

Figure 2:
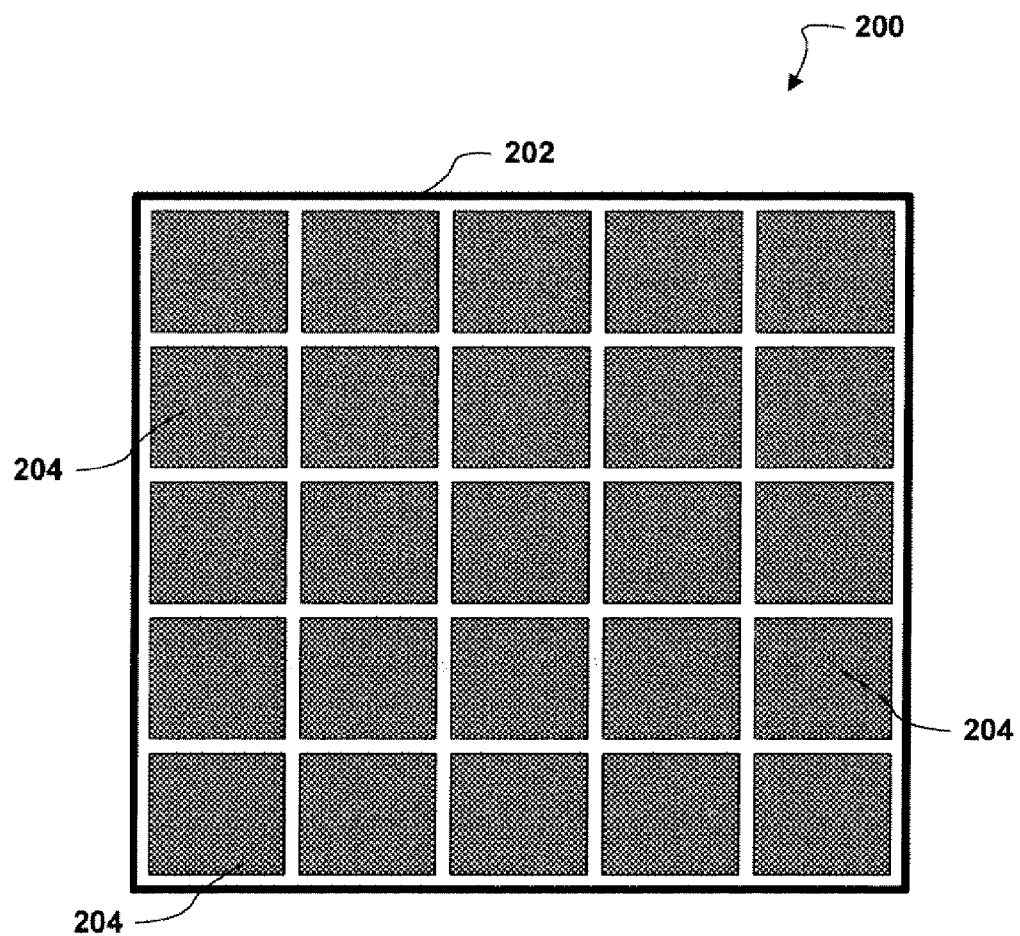
FIG. 2 is a plan view of an embodiment of a seek-scan probe (SSP) phase-change memory.

FIG. 2 illustrates an embodiment of a phase-change memory 200. Memory 200 includes a plurality of individual memory cells or sub-islands 204 grouped into an array 202. Each memory cell 204 includes a heater therein (see, e.g., FIGS. 4 and 5), and the heater in each memory cell 204 is individually addressable, meaning that each memory cell 204 in array 202 can be heated independently of the others. As shown, memory 200 includes 25 memory cells 204 grouped into a five-by-five array 202. In other embodiments, the number of memory cells 204 can be greater than or less than 25, and in other embodiments can be grouped into arrays of different shapes than the array 202 shown in the figure. Although not shown in the figure, memory 200 can also include one or more probes, such as probe 102 or some other type of probe, to write and read data to and from each memory cell. In one embodiment, memory 200 can include one probe that can read and write in all the memory cells 204, but in other embodiments more probes can be used. In some embodiments, for example, each memory cell 204 can have one or more probes of its own, while in other embodiments a single probe can cover a subset of memory cells 204 within array 202. Still other embodiments can include separate probes for writing and reading, either over the whole array 202 or in individual memory cells or groups of memory cells.

Figure 3:
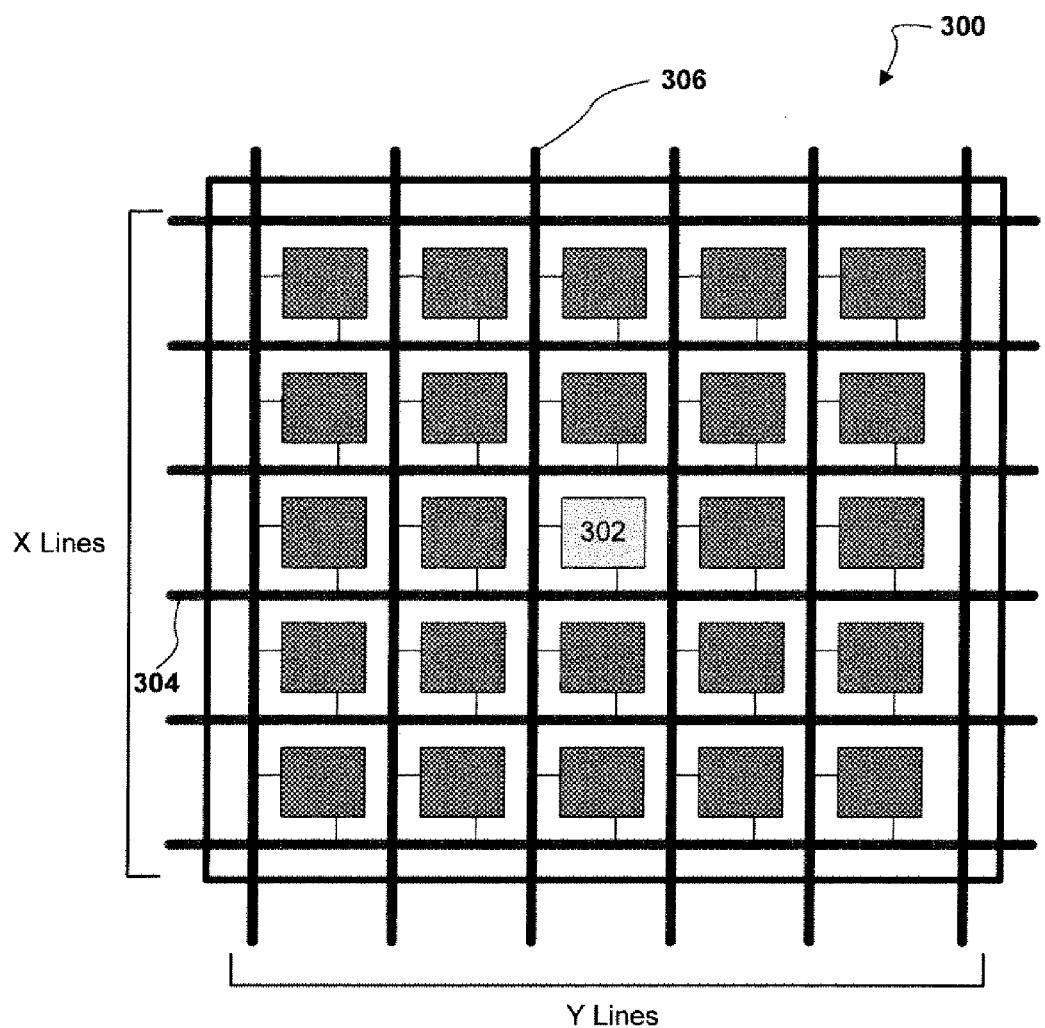
FIG. 3 is a plan view of an embodiment of an array of individually addressable phase-change memory cells comprising a phase-change memory.

FIG. 3 illustrates an embodiment of a memory 300 having individually addressable memory cells. As with the memory 200, memory 300 includes one or more memory cells or sub-islands grouped into an array and can include one or more probes (not shown) to write data to and read data from individual cells. A plurality of conductive lines are formed between the memory cells such that each memory cell is electrically coupled to two lines and can therefore be individually addressed. In the embodiment shown the memory cells are arranged such that each memory cell in the array is electrically coupled to both an X-line and a Y-line. For example, memory cell 302 is coupled to X-line 304 and Y-line 306. One or both of the X-lines and Y-lines are coupled to circuitry (not shown) that allows memory cell 302 to be individually addressed by activating X-line 304 and Y-line 306. In one embodiment, for example, the X-lines can be coupled to a power source and to control circuitry, while the Y-lines can be coupled to ground and also to the control circuitry.

In the embodiment shown, the memory cells are arranged in a regular X-Y array, such that the conductive lines include a plurality of X-lines as well as a plurality of Y-lines and each memory cell in the array is electrically coupled to both an X-line and a Y-line. The X-lines and Y-lines are positioned between individual memory cells, but in other embodiments a different routing of one or both of the X-lines and Y-lines is possible. Moreover, memory 300 is shown as a regular five-by-five array, but in other embodiments different numbers of cells and different arrangements within the array can be used.

Figure 4:
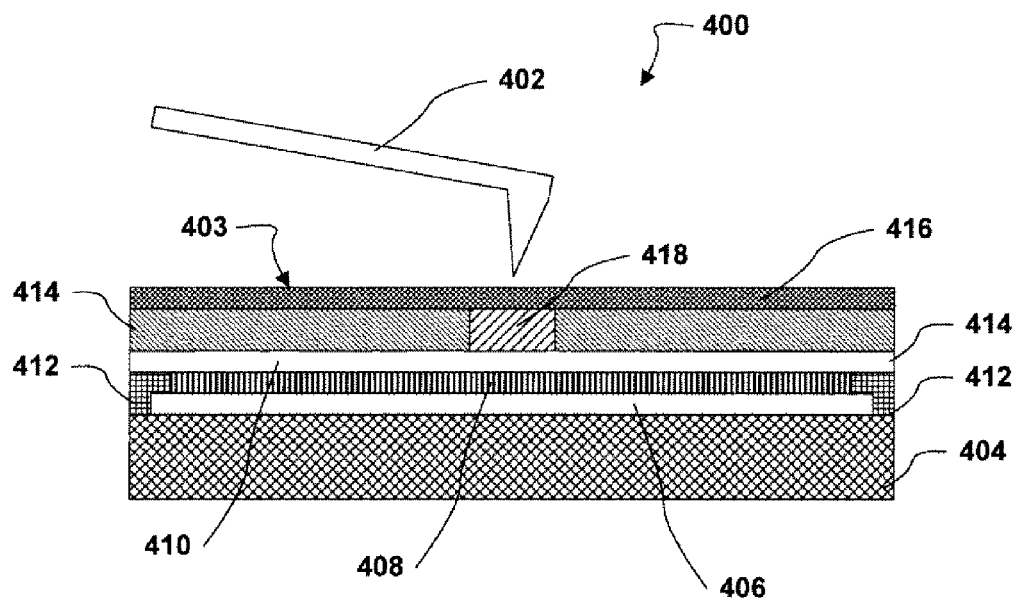
FIG. 4 is a cross-sectional elevation of an embodiment of a memory cell useable, for example, in the cell arrays shown in FIG. 2 or 3.

FIG. 4 illustrates an embodiment of an SSP phase-change memory 400 that can be used as memory cell 204 in an embodiment of memory 200 or as memory cell 302 in an embodiment of memory 300. Memory 400 includes a probe 402 and a memory cell 403. Memory cell 403 includes a substrate 404 upon which a heater is formed. The heater includes a first electrode 406, a second electrode 410, and a heater layer 408 sandwiched between first electrode 406 and second electrode 410. The heater is surrounded by a dielectric 412. A phase-change layer 414 is formed on the heater and a protective layer 416 is optionally formed on the phase-change layer 416.

Probe 402 is shown as a cantilever-type probe, but in other embodiments probe 402 can, of course, be a different kind of probe. For example, probe 402 can be supported from one or more bridge structures that straddle the memory cell 403. Substrate 404 can be any kind of substrate that is compatible with the manufacturing requirements for the memory 400 and whose properties are consistent with the construction of memory 400. In one embodiment substrate 404 can be one or more of the various forms of silicon, such as polysilicon, single-crystal silicon, and the like. In other embodiments, substrate 404 can be made of different materials. Dielectric layer 412 surrounds first electrode 406 and heater layer 408 and supports second electrode 410. In one embodiment, dielectric layer 412 is made of silicon oxide (nominally $SiO_2$), but in other embodiments a different dielectric can be used.

The heater is sandwiched between substrate 404 and phase-change layer 414. In the embodiment shown, first electrode 406 is formed on substrate 404, heater layer 408 is formed on first electrode 406, and second electrode is formed on heater layer 408 and dielectric 412 and is in contact with phase-change layer 414. To make memory 400 individually addressable, first electrode 406 and second electrode 410 are coupled to separate electrical connections that can be selectively activated or de-activated to turn the heater on and off. For example, if memory 400 is used as an embodiment of memory cell 302 (see FIG. 3), first electrode 406 can be electrically coupled to X-line 304 and second electrode 410 can be electrically coupled to Y-line 306, or vice versa. First electrode 406 and second electrode 410 can be made of any conductive material. In one embodiment, first electrode 406 and second electrode 408 are made of a metal such as gold (Au), copper (Cu) or aluminum (Al). In other embodiments, however, first electrode 406 and second electrode 408 can be made of other metals, metal alloys, or conductive non-metals. Moreover, first electrode 406 and second electrode 410 need not be made of the same material; in some embodiments, for example, first electrode 406 can be made of a conductive non-metal and second electrode 408 can be made of a metal.

Heater layer 408 is sandwiched between first electrode 406 and second electrode 410 and has a width less than the width of phase-change layer 414. In other embodiments, the width of heater layer 408 can be smaller or greater than the width shown. For example, in one embodiment heater layer 408 can have the same or larger width than phase-change layer 414. Moreover, although described as a "layer," the heater layer need not have a thin flat shape as shown, but can instead take on any regular or irregular shape. Heater layer 408 can be made of any material having a relatively high electrical resistivity (or, conversely, a low electrical conductivity), such that its temperature increases when an electrical current is passed through it. Examples of materials that can be used in different embodiments for heater layer 408 include Titanium Aluminum Nitride (nominally TiAlN) and Titanium Nitride (nominally TiN), Titanium Silicon Nitride (nominally TiSiN), and Carbon Nitride (nominally CN).

Phase-change layer 414 is formed on second electrode 410. Any material that changes phase and whose different phases have different electrical characteristics (such as different resistivities or, conversely, different conductivities) can be used for phase-change layer 414. One embodiment, for example, can use chalcogenide materials for the phase-change layer. Chalcogenides are glass-like materials containing a chalcogenide element (which include, but are not limited to, sulfur, selenium or tellurium) as a substantial constituent. Examples of chalcogenides useful in a phase change memory include Germanium-sulfur-tellurium (nominally GeSTe), Germanium-Antimony-Tellurium (nominally GeSbTe) and Silver-Indium-Antimony-Tellurium (nominally AgInSbTe). Other examples of chalcogenide materials include Indium-Selenium (nominally InSe), Antimony-Selenium (nominally SbSe), Antimony-Tellurium (nominally SbTe), Indium-Antimony-Selenium (nominally InSbSe), Indium-Antimony-Tellurium (nominally InSbTe), Germanium-Antimony-Selenium (nominally GeSbSe*), Germanium-Antimony-Tellurium-Selenium (nominally GeSbTeSe), and Silver-Indium-Antimony-Selenium-Tellurium (nominally AgInSbSeTe). Other materials besides chalcogenides can, of course, be used in other embodiments.

Optional protective layer 416 is formed on phase-change layer 414 to protect the phase-change layer from contaminants and from mechanical damage that can happen, for example, if probe 402 should come in contact with the memory cell 403. Preferably, but not necessarily, protective layer 416 is made of a material with substantial toughness and hardness properties. In one embodiment, protective layer can be made using diamond-like carbon (DLC), but in other embodiments other materials can be used, such as doped or undoped silicon carbide or ceramic materials such as titanium nitride (nominally TiN) or titanium-aluminum-nitrate (nominally TiAlN)

In operation of memory 400, data bits are written in phase-change layer 414 by passing a current between the tip of probe 402 and second electrode 410. Phase-change layer 414 is initially in a uniform phase, such as an amorphous phase, but the temperature generated by the electrical current passed between the tip of probe 402 and second electrode 410 (greater than about 200 C in one embodiment) transforms a small region 418 of phase-change layer 414 from an amorphous phase with relatively higher resistivity to a polycrystalline phase with relatively lower resistivity; region 418 then represents a data bit written in the phase-change layer. Probe 402, or another probe, can then read the data bits stored in phase-change layer 414 by passing a small current between probe 402 and second electrode 410 and sensing changes in electrical resistivity.

To erase bits written in phase-change layer 414, the heater under phase-change layer 414 is activated by activating first electrode 406 and second electrode 410, such that a current flows between electrodes and through heater layer 408. As current flows through heater layer 408 its temperature increases, thus also heating phase-change layer 414. After phase-change layer 414 is heated to the temperature required to obtain a phase change, the heater is turned off and phase-change layer 414 is allowed to cool such that substantially the entire layer reverts to its original uniform phase. In an embodiment where the phase-change layer is a chalcogenide and the data bits are represented by polycrystalline regions in amorphous media, the erasing is done by raising the temperature of the phase-change layer beyond its melting point (usually greater than 500 C for some chalcogenides) and rapidly quenching the film into its amorphous phase. In a chalcogenide embodiment where the data bits are represented by amorphous regions in polycrystalline media, the phase-change layer is heated to a temperature high enough to induce crystalline growth (300-400 C for certain chalcogenides) and held at that temperature long enough to create crystalline growth that erases the amorphous areas. Alternatively, the phase-change layer could be heated to its melting temperature, but cooled down relatively slowly (~1 microsecond for some chalcogenides); the slower cooling produces a crystalline phase instead of the amorphous phase that results from rapid quenching.

A result of this erasing process is that substantially all the data bits that were written in the phase-change layer are completely erased, thus completely erasing the memory or memory cell and leaving behind little or no residual data that can later be read to recover the original data. This is in contrast to magnetic memories, for example, in which a standard erase operation leaves behind residual magnetic traces that can later be read to retrieve the data thought to have been erased.

Using the erasing procedure explained above, entire blocks of data such as the entire contents of a memory cell are erased simultaneously or near-simultaneously, meaning that very high data erase rates can be achieved. The exact data erase rate will depend on what the data bit density is in a memory cell and how many data bits are written there. In some embodiments, data erase rates exceeding 100 megabits per second can be achieved, while in other embodiments even higher data rates equal to or exceeding one terabits per second can be achieved.

In a memory such as memory 300 with individually addressable memory cells, extremely high data erase rates can be achieved, for example, by simultaneously activating the heaters in all memory cells in the array; this would result in simultaneous or near-simultaneous erasing of the entire memory 300. This could result in data erase rates vastly exceeding 1 terabits per second. In other embodiments in which lesser data erase rates are needed, the heaters in the memory cells can, for example, be activated in rapid succession or can be activated one at a time. Of course, not every memory cell within memory 300 need be erased if the data in a particular cell should be kept.

Figure 5:
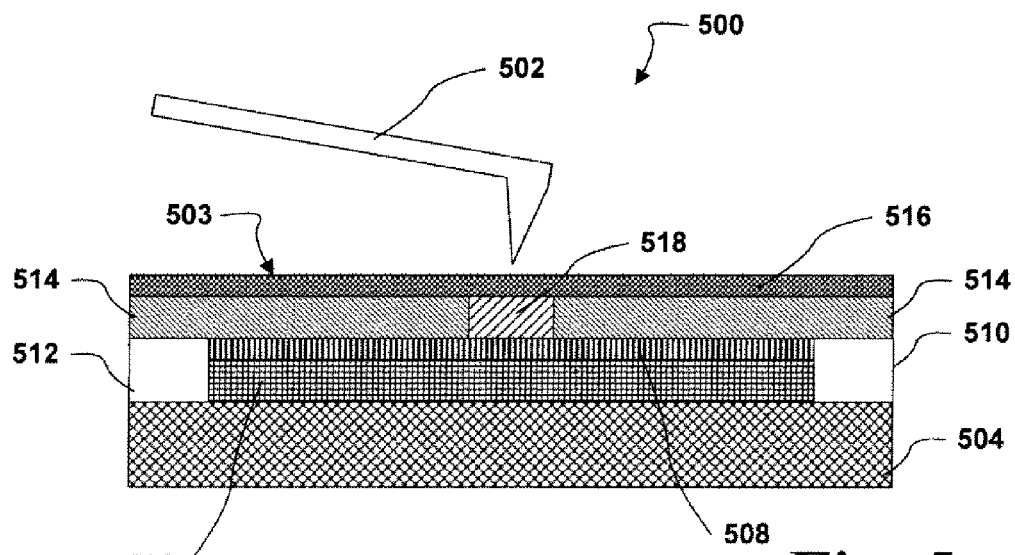
FIG. 5 is a cross-sectional elevation of an alternative embodiment of a memory cell useable, for example, in the cell arrays shown in FIG. 2 or 3.

FIG. 5 illustrates an alternative embodiment of an SSP phase-change memory 500 that can be used as a memory cell 204 in an embodiment of memory 200 or as a memory cell 302 in an embodiment of memory 300. Memory 500 includes a probe 502 and a memory cell 503. Memory cell 503 includes a substrate 504 upon which a heater is formed. The heater includes a first electrode 510, a second electrode 512 and a heater layer 508 extending laterally between first electrode 510 and second electrode 512. Heater layer 508 is supported between the first and second electrodes by a dielectric 512 sandwiched between the heater layer and the substrate. A phase-change layer 514 is formed heater layer 508 and electrodes 510 and 512, and a protective layer 516 is optionally formed on the phase-change layer 516.

Probe 502 is shown as a cantilever-type probe but, as with probe 402, probe 502 can be a different kind of probe. Also, as with substrate 404, substrate 504 can be any substrate compatible with the manufacturing and construction requirements for memory 500, such as polysilicon, single-crystal silicon, and other substrate materials not listed. In other embodiments, substrate 504 can be made of different materials.

Memory cell 504 differs from memory cell 403 mostly in the construction of the heater. In memory cell 503, the heater is also sandwiched between substrate 504 and phase-change layer 514. Unlike memory cell 403, however, first electrode 510 and second electrode 512 are formed on substrate 504 near the edges of memory cell 503, and heater layer 508 is electrically coupled to first electrode 510 and second electrode 512 and extends laterally between the two. Heater layer 508 is in contact with phase-change layer 514 to improve heat transfer to that layer during heating and, although described as a "layer," heater layer 508 need not have a thin flat shape as shown, but can instead take on any regular or irregular shape. Heater layer 508 can be made of any material having a relatively high electrical resistivity (or, conversely, a low electrical conductivity), such that its temperature increases when an electrical current is passed through it. Examples of materials usable in different embodiments of heater layer 508 include at least the materials that can be used for heater layer 408. Dielectric layer 506 is sandwiched between heater layer 508 and substrate 504 and supports heater layer 508. Dielectric layer 506 can be made of silicon oxide (nominally SiO2), but in other embodiments different dielectrics can be used.

To make memory 500 individually addressable, first electrode 510 and second electrode 512 can be coupled to separate electrical connections that can be selectively activated or de-activated to turn the heater on and off, as described above for memory 400. As with electrodes 406 and 410, first electrode 510 and second electrode 512 can be made of any conductive material and need not be made of the same material; in some embodiments, for example, first electrode 510 can be made of a conductive non-metal and second electrode 512 can be made of a metal.

Phase-change layer 514 is formed on second electrode 510. As with phase change layer 414, any material that changes phase and whose different phases have different electrical characteristics can be used for phase-change layer 514. One embodiment, for example, uses chalcogenides for the phase-change layer; any of the chalcogenides listed above for phase-change layer 414, as well as others not listed, can be used for phase-change layer 514. Optional protective layer 516 is formed on phase-change layer 514 to protect phase-change layer 514 from contaminants and from mechanical damage that might happen, for example, if probe 502 should come in contact with the memory cell 503.

Memory 500 operates similarly to memory 400. Data bits are written in phase-change layer 514 by passing a current between the tip of probe 502 and heater layer 508, transforming a region 518 of phase-change layer 514 from an amorphous phase with relatively higher resistivity to a polycrystalline phase with relatively lower resistivity; region 518 then represents a data bit written in the phase-change layer. Probe 502, or another probe, can then read the bits stored in phase-change layer 514 by sensing changes in electrical resistivity. To erase bits written in phase-change layer 514, the heater is activated by activating first electrode 510 and second electrode 512, such that a current flows through heater layer 508. As current flows through heater layer 508 its temperature increases and heats phase-change layer 514. After phase-change layer 514 is heated to the temperature required to obtain a phase change, the heater is turned off and phase-change layer 514 is allowed to cool such that substantially the entire layer reverts to its original amorphous phase.

Figure 6:
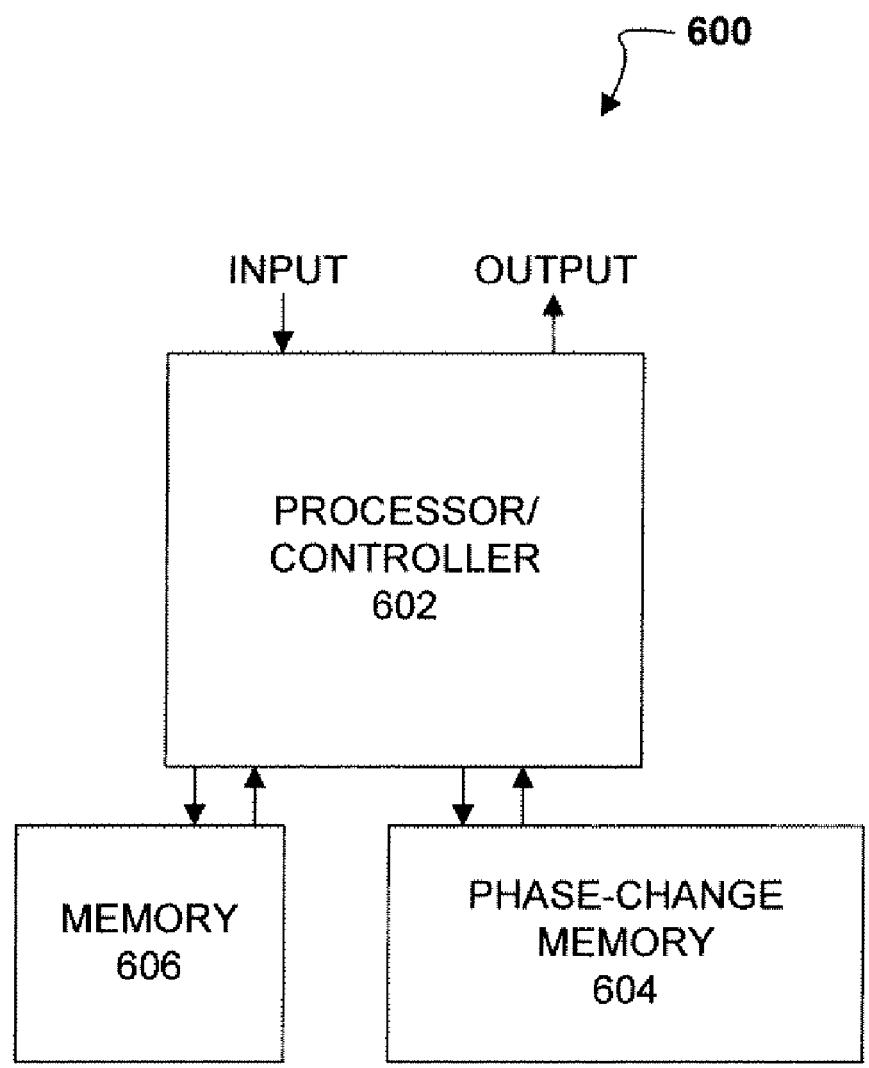
FIG. 6 is a schematic block diagram of an embodiment of a system using one or more embodiments of a phase-change memory such as those shown in FIGS. 2, 3, 4 and/or 5.

FIG. 6 illustrates an embodiment of a system 600 including an embodiment of a phase-change memory such as memory 300 that can include memory cells such as memory 400 or memory 500. System 600 includes a processor 602 to which are coupled a memory 606 and a phase-change memory 604 such as seek-scan probe (SSP) memory.

Processor 602, in addition to being coupled to memories 604 and 604, has an input and an output through which it can receive data and send data, respectively. In one embodiment processor 602 can be a traditional general-purpose microprocessor, although in other embodiments processor 602 can be another type of processor, such as a programmable controller or an application-specific integrated circuit (ASIC).

Memory 606 can be any type of volatile or non-volatile memory or storage. Volatile memories that can be used in different embodiments of memory 606 include random-access memory (RAM), dynamic random access memory (DRAM), synchronous dynamic random access memory (SDRAM) and the like. Non-volatile memories that can be used in different embodiments of memory 606 include magnetic and optical disk drives.

Phase-change memory 604 can, in different embodiments, be a memory such as memories 200 or 300 shown in FIGS. 2 and 3 respectively. Different embodiments of memories 200 or 300 can include therein memory cells with the constructions shown in connection with memories 400 and 500. In still other embodiments, every memory cell within a memory such as memory 200 or 300 need not have the same construction; any given memory can include cells of different constructions.

In operation of system 600, processor 602 can receive and send data through its input and output, and can both read and write data to both the memory 606 and the phase-change memory 604. Processor 602 can control the erasure of data from one or more cells in phase-change memory 604 by selectively activating the heater in the relevant cell. If information in a cell within the phase-change memory needs to be corrected, the data can be read from the phase-change memory 604 and temporarily held in memory 606. While the data is held in memory 606, the relevant cells in phase-change memory 604 are erased and the data can then be retrieved from memory 606 and re-written onto the phase-change cells where it previously was written.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
a semiconductor substrate formed, at least in part, of silicon;
an individually addressable heater formed on the substrate, the individually addressable heater including, a heater layer, and first and second electrodes electrically coupled to the heater, wherein the heater layer occupies more than half of a space between the first and second electrodes;
a phase-change layer formed on the heater; and
a probe to write data to and read data from the phase-change layer, wherein the probe to pass electrical current through the first and second electrodes to write data to and read data from the phase-change layer.

2. The apparatus claim 1, wherein the semiconductor substrate, the individually addressable heater, and the phase-change layer are formed on a first integrated circuit.

3. The apparatus of claim 2, further comprises: a controller formed on a second integrated circuit to control the individually addressable heater, wherein the second integrated circuit is coupled with the first integrated circuit.

4. The apparatus of claim 1, further comprises a protective layer formed on the phase-change layer.

5. The apparatus of claim 1, wherein the probe is a movable probe positioned above the phase-change layer.

6. The apparatus of claim 1, wherein the phase-change layer includes a chalcogenide material.

7. The apparatus of claim 1, wherein the individually addressable heater is operable to apply heat to a memory cell independent of another memory cell.

8. The apparatus of claim 1 further comprises a dielectric layer surrounding the individually addressable heater.

9. The apparatus of claim 8, wherein the dielectric layer is coupled to the phase-change layer.

10. The apparatus of claim 1 further comprises a dielectric layer surrounding the individually addressable heater and the first electrode.

11. The apparatus of claim 1, wherein the individually addressable heater is formed on the first electrode.

12. The apparatus of claim 1, wherein first and second electrodes are coupled to separate electrical connections that can selectively turn on or off the individually addressable heater.

13. The apparatus of claim 1, wherein the first and second electrodes are formed of at least one of: gold, copper, or aluminum.

14. The apparatus of claim 1, wherein the first and second electrodes are formed from different materials.

15. The apparatus of claim 1, wherein the individually addressable heater has a width which is lesser than the width of the phase-change layer.

16. The apparatus of claim 1, wherein the individually addressable heater is formed from at least one of: Titanium Aluminum Nitride, Titanium Nitride, Titanium Silicon Nitride, or Carbon Nitride.

17. The apparatus of claim 1 further comprises a memory device including the semiconductor substrate.

18. The apparatus of claim 17, wherein the individually addressable heater is operable to erase bits in blocks of the memory device near-simultaneously.

19. The apparatus of claim 1, wherein the individually addressable heater extends laterally between the first and second electrodes.

20. The apparatus of claim 1, wherein the probe is a cantilever-type probe.

21. The apparatus of claim 1, wherein the first and second electrodes are formed on the semiconductor substrate near the edges of a memory cell.

22. The apparatus of claim 1, wherein the individually addressable heater has an irregular shape.

23. A system comprising:
a controller;
a memory device coupled with the controller, the memory device including, a semiconductor substrate formed, at least in part, of silicon;
an individually addressable heater formed on the substrate, the individually addressable heater including, a heater layer, and first and second electrodes electrically coupled to the heater, wherein the heater layer occupies more than half of a space between the first and second electrodes;
a phase-change layer formed on the heater, wherein the phase-change layer includes a chalcogenide material; and
a probe to write data to and read data from the phase-change layer, wherein the probe to pass electrical current through the first and second electrodes to write data to and read data from the phase-change layer.

24. The system of claim 23, wherein the controller is formed on a first integrated circuit and the memory device is formed on a second integrated circuit.

25. The system of claim 24, wherein the controller can control the erasure of data from the memory device by selectively activating the heater.

* * * * *

UNITED STATES PATENT AND TRADEMARK OFFICE
CERTIFICATE OF CORRECTION

PATENT NO. : 8,338,813 B2  
APPLICATION NO. : 12/631265  
DATED : December 25, 2012  
INVENTOR(S) : Qing Ma, Valluri R. Rao and Tsung-Kuan Allen Chou Page 1 of 1

It is certified that error appears in the above-identified patent and that said Letters Patent is hereby corrected as shown below:

In the Specifications:

In Column 7, line 14, delete "512", and insert --506--.

Signed and Sealed this  
Seventh Day of May, 2013

Teresa Stanek Rea  
*Acting Director of the United States Patent and Trademark Office*